US012580671B2

(12) United States Patent (10) Patent No.: US 12,580,671 B2
Su et al. (45) Date of Patent: Mar. 17, 2026

(54) SERVICE PROCESSING METHOD AND APPARATUS AND DEVICE

(71) Applicant: Huawei Technologies Co., Ltd., Shenzhen (CN)

(72) Inventors: Wei Su, Dongguan (CN); Qiuyou Wu, Shenzhen (CN); Yujie Chen, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 739 days.

(21) Appl. No.: 17/973,365

(22) Filed: Oct. 25, 2022

(65) Prior Publication Data

US 2023/0052223 A1 Feb. 16, 2023

Related U.S. Application Data

(63) Continuation of application No. PCT/CN2021/087282, filed on Apr. 14, 2021.

(30) Foreign Application Priority Data

Apr. 27, 2020 (CN) .......................... 202010344926.8
Jun. 15, 2020 (CN) .......................... 202010544327.0

(51) Int. Cl.
*H04B 10/00* (2013.01)
*H04J 3/16* (2006.01)
(52) U.S. Cl.
CPC ..... *H04J 3/1664* (2013.01); *H04J 2203/0053* (2013.01); *H04J 2203/0085* (2013.01); *H04J 2203/0089* (2013.01)
(58) Field of Classification Search
CPC ........ H04J 14/02; H04J 3/1664; H04J 3/1652; H04J 3/1658; H04J 14/0272;
(Continued)

(56) References Cited

U.S. PATENT DOCUMENTS 7,826,741 B2 * 11/2010 Katagiri .............. H04J 14/0227
398/58
8,340,134 B1 12/2012 Gorshe
(Continued)

FOREIGN PATENT DOCUMENTS

CN 105871502 A 8/2016
CN 106301678 A 1/2017
(Continued)

OTHER PUBLICATIONS

The Telecommunication Technology Committee, JT-G709 Interfaces for the Optical Transport Network (OTN), TTC Standard, Edition 2.1, The Telecommunication Technology Committee, Mar. 2011, pp. 94, 104-106, 168-170, [retrieved on Jan. 26, 2024]. total 251 pages.
(Continued)

*Primary Examiner* — Hanh Phan
(74) *Attorney, Agent, or Firm* — Slater Matsil, LLP

(57) ABSTRACT

A service processing method and apparatus and a device is disclosed. Synchronization headers of four 66b code blocks are removed, and a 1-bit code block type indication is added as control information of service data, to be encoded as a 257b code block. This avoids a bandwidth waste caused by the synchronization headers, and improves bandwidth utilization. When a 257b code block stream is mapped to an OSUflex frame, the code block type indication is mapped to an overhead area of the OSUflex frame, the four 66b code blocks from which the synchronization headers are removed are mapped to a payload area of the OSUflex frame, and check information obtained by checking the control information is mapped to the overhead area of the OSUflex frame, so that bit error protection is performed on the control information.

17 Claims, 9 Drawing Sheets

(58) Field of Classification Search
CPC ..... H04J 14/0273; H04B 10/27; H04B 10/40;
H04B 10/516; H04B 10/0795; H04Q
11/0066; H04Q 11/0062; H04Q 11/0067
USPC ...... 398/66, 67, 68, 69, 701, 71, 72, 98, 99,
398/100, 79, 135, 136, 158, 159, 59, 33,
398/38, 25, 26, 27, 45, 48, 49, 183, 194,
398/70; 370/535, 539, 466, 476, 474,
370/545, 472
See application file for complete search history.

(56) References Cited

U.S. PATENT DOCUMENTS

| | | | | |
|---|---|---|---|---|
| 11,683,122 | B2 * | 6/2023 | Lusted | H04L 1/0057 |
| | | | | 714/776 |
| 2011/0126074 | A1 | 5/2011 | Calderon et al. | |
| 2015/0098702 | A1 * | 4/2015 | Togo | H04L 12/6418 |
| | | | | 398/66 |
| 2018/0375604 | A1 * | 12/2018 | Su | H04Q 11/0062 |
| 2019/0199449 | A1 | 6/2019 | Loprieno et al. | |
| 2020/0328767 | A1 | 10/2020 | Zhong et al. | |
| 2021/0126707 | A1 | 4/2021 | Tanaka et al. | |

FOREIGN PATENT DOCUMENTS

| | | |
|---|---|---|
| CN | 107086897 A | 8/2017 |
| CN | 109981209 A | 7/2019 |
| EP | 3319254 A1 | 5/2018 |
| JP | 2002290381 A | 10/2002 |
| JP | 2019220883 A | 12/2019 |
| WO | 2017173661 A1 | 10/2017 |
| WO | 2019128664 A1 | 7/2019 |
| WO | 2019153253 A1 | 8/2019 |
| WO | 2019228201 A1 | 12/2019 |

OTHER PUBLICATIONS

Jean-Michel Caia Cict P R China, "OSUflex block format, sequence, and overhead options for flexible Sub1G muxing; WD11-34", ITU-T Draft; Study Group 15; Series WD11-34, International Telecommunication Union, Geneva; CH, vol. 11/15 Oct. 21, 2019 (Oct. 21, 2019), pp. 1-9, XP044276031.

ITU-T G.7041/Y.1303, Series G: Transmission Systems and Media, Digital Systems and Networks Data over Transport-Generic aspects-General Series Y: Global Information Infrastructure, Internet Protocol Aspects, Next-Generation Networks, Internet of Things and Smart Cities Internet protocol aspects-Transport Generic framing procedure, Aug. 6, 2016, total 80 pages.

* cited by examiner

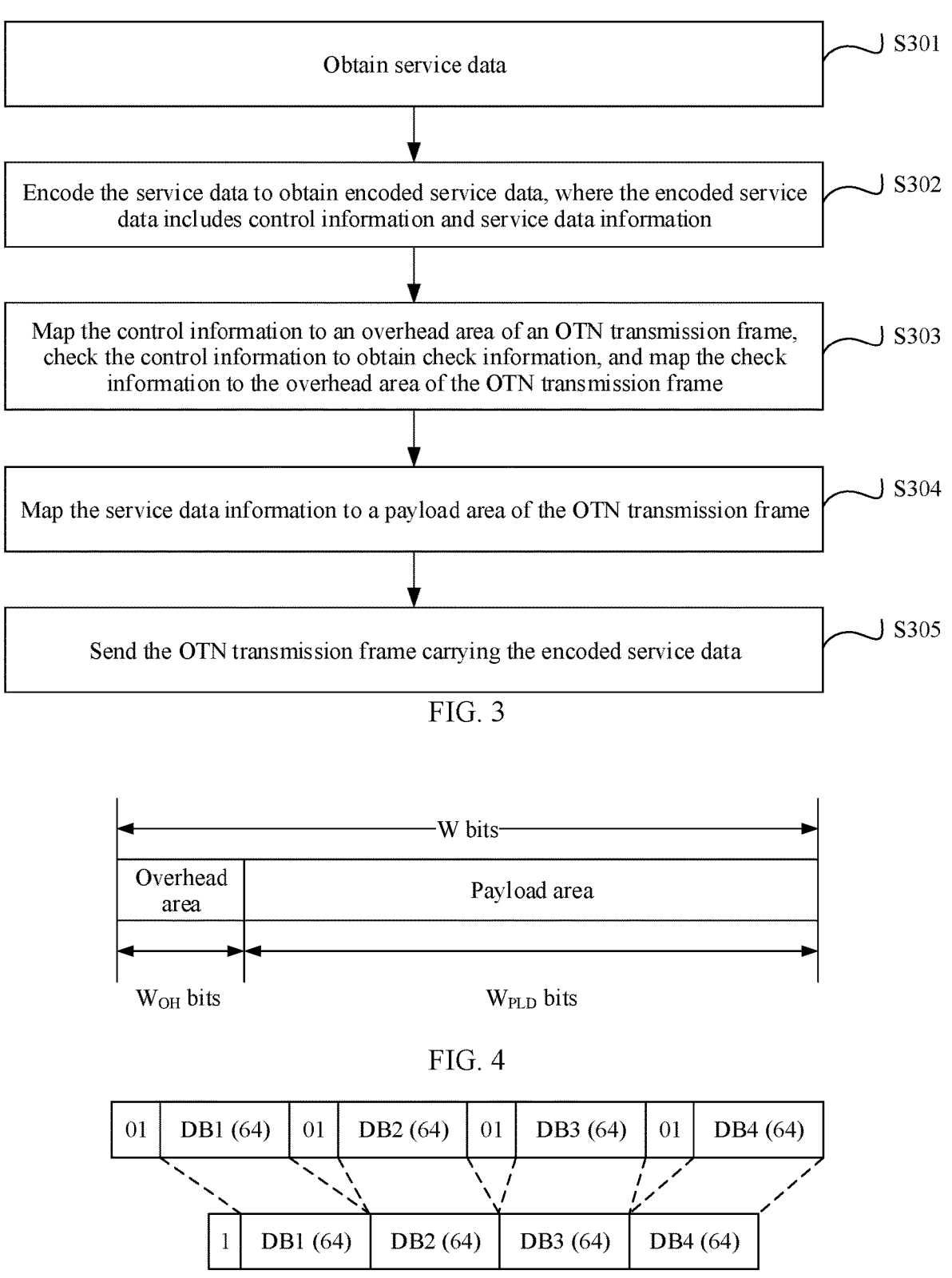

| Obtain service data | S301 |

Encode the service data to obtain encoded service data, where the encoded service data includes control information and service data information — S302

Map the control information to an overhead area of an OTN transmission frame, check the control information to obtain check information, and map the check information to the overhead area of the OTN transmission frame — S303

Map the service data information to a payload area of the OTN transmission frame — S304

Send the OTN transmission frame carrying the encoded service data — S305

FIG. 3

W bits

| Overhead area | Payload area |

W_OH bits                W_PLD bits

FIG. 4

| 01 | DB1 (64) | 01 | DB2 (64) | 01 | DB3 (64) | 01 | DB4 (64) |

| 1 | DB1 (64) | DB2 (64) | DB3 (64) | DB4 (64) |

FIG. 5

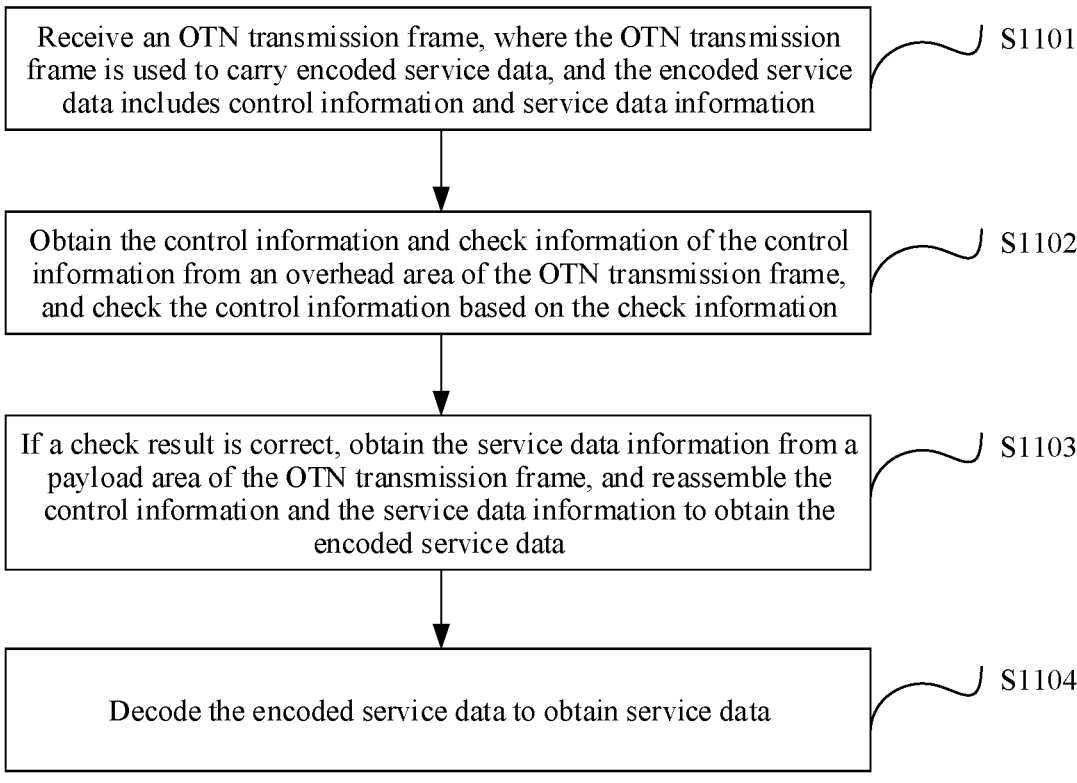

Receive an OTN transmission frame, where the OTN transmission frame is used to carry encoded service data, and the encoded service data includes control information and service data information    S1101

Obtain the control information and check information of the control information from an overhead area of the OTN transmission frame, and check the control information based on the check information    S1102

If a check result is correct, obtain the service data information from a payload area of the OTN transmission frame, and reassemble the control information and the service data information to obtain the encoded service data    S1103

Decode the encoded service data to obtain service data    S1104

FIG. 11

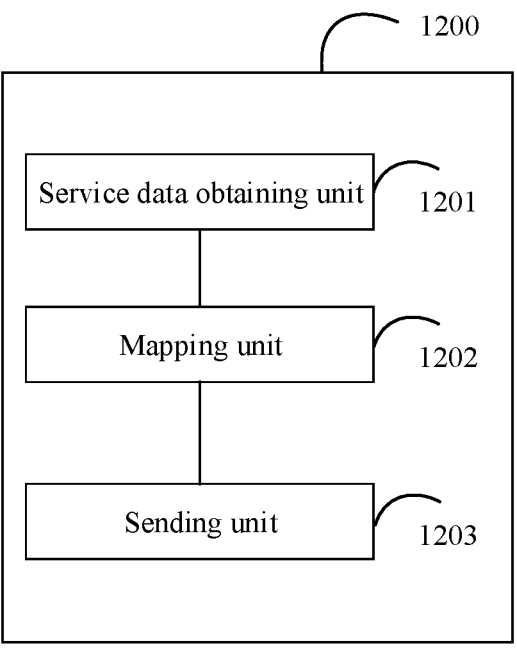

1200

Service data obtaining unit   1201

Mapping unit   1202

Sending unit   1203

SERVICE PROCESSING METHOD AND APPARATUS AND DEVICE

CROSS-REFERENCE TO RELATED APPLICATIONS

This application is a continuation of International Patent Application No. PCT/CN2021/087282, filed on Apr. 14, 2021, which claims priority to Chinese Patent Application No. 202010344926.8, filed on Apr. 27, 2020 and Chinese Patent Application No. 202010544327.0, filed on Jun. 15, 2020. All of the aforementioned patent applications are hereby incorporated by reference in their entireties.

TECHNICAL FIELD

Embodiments of this application relate to the field of communication technologies, and in particular, to a service processing method and apparatus and a device.

BACKGROUND

Featuring high bandwidth, a large capacity, high reliability, a low delay, and the like, an optical transport network (OTN) has become a mainstream technology used in transport networks. The OTN may be applied to a backbone network, a metropolitan area core network, an aggregation network, and the like, and further extends to an access network. In addition to providing high-bandwidth transmission capabilities such as n*1.25 Gbps and n*5 Gbps, the OTN needs to have a transmission capability as low as several megabits per second in the future.

A packet service is the most important service type carried by the OTN. Currently, a generic framing procedure-framer (GFP-F) and an idle mapping procedure (IMP) are usually used to map packet services to OTN transmission frames. However, a bandwidth waste problem exists in the mapping manners of the GFP-F and the IMP.

SUMMARY

Embodiments of this application provide a service processing method and apparatus and a device, to resolve a bandwidth waste problem.

According to a first aspect, an embodiment of this application provides a service processing method. The method includes: obtaining service data; encoding the service data to obtain encoded service data, where the encoded service data includes control information and service data information; mapping the control information to an overhead area of an optical transport network OTN transmission frame, checking the control information to obtain check information, and mapping the check information to the overhead area of the OTN transmission frame; mapping the service data information to a payload area of the OTN transmission frame; and sending the OTN transmission frame carrying the encoded service data.

According to the solution provided in this embodiment of this application, the service data information is mapped to the payload area of the OTN transmission frame, and the control information is mapped to the overhead area, so that a bit rate of the OTN payload area matches a transmission rate of the service data, thereby improving bandwidth utilization. In addition, the information obtained after checking is mapped to the overhead area, to perform bit error protection on the control information, so that when a bit error occurs, a receive end can find the error in a timely manner, and the receive end is prevented from processing a faulty data packet as a correct data packet, thereby improving transmission reliability.

In a possible design, the service data may be packet data, and the packet data is medium access control (MAC) frame data, an Internet protocol IP packet, a multi-protocol label switching (MPLS) packet, a flexible Ethernet (FlexE) service code block stream, or a 66b code block stream.

In a possible design, the encoding the service data includes: performing 64b/66b encoding on the service data to obtain the encoded service data. When the service data is a 66b code block stream, there may be no need to perform 64b/66b encoding on the service data.

In a possible design, the encoding the service data includes: performing 64b/66b encoding on the service data to obtain a 66b code block stream; and performing 256b/257b encoding processing on the 66b code block stream to obtain a 257b code block stream, where the 257b code block stream is the encoded service data. When the service data is a 66b code block stream, there may be no need to perform 64b/66b encoding on the service data.

In a possible design, the service data is a 66b code block stream, and the encoding the service data includes: performing 256b/257b encoding processing on the service data to obtain the encoded service data.

For example, when 256b/257b encoding is performed on the 66b code block stream, a synchronization header of a 66b code block is removed, and 1-bit control information is added, to reduce a bandwidth waste caused by the synchronization header and improve bandwidth utilization.

In a possible design, the control information includes a code block type indication. The code block type indication is used to indicate a code block type of a 257b code block.

In a possible design, when the code block type indication indicates that a 257b code block is a control code block, the encoded service data further includes a first code block pattern indication; and the first code block pattern indication is used to indicate a pattern of a 66b code block included in a code block in which the first code block pattern indication is located. It should be noted that the first code block pattern indication is mapped to the payload area of the OTN transmission frame.

In a possible design, the first code block pattern indication included in the encoded service data is encoded into a second code block pattern indication, and a minimum Hamming distance between different values of the second code block pattern indication is 2. For example, the first code block pattern indication included in the encoded service data is replaced with the second code block pattern indication. The second code block pattern indication herein indirectly indicates a pattern of a 66b code block included in a 257b code block in which the second code block pattern indication is located. For example, the second code block pattern indication and the first code block pattern indication occupy a same quantity of bits, that is, 4 bits.

In the foregoing design, the second code block pattern indication is encoded in a manner in which the minimum Hamming distance is 2, to ensure that the 4 bits have a stronger fault tolerance capability, and the receive end can find a bit error occurring in any one of the 4 bits in a timely manner, so that the receive end is prevented from processing a faulty data packet as a correct data packet, thereby improving transmission reliability.

In a possible design, when the code block type indication indicates that the 257b code block is a 257b control code block, the method further includes: adding a third code block pattern indication to the encoded service data, where the third code block pattern indication is used to indicate a pattern of a 66b code block included in a code block in which the third code block pattern indication is located, and a minimum Hamming distance between different values of the third code block pattern indication is 2. In the foregoing design, the third code block pattern indication is encoded in a manner in which the minimum Hamming distance is 2, to ensure that the 4 bits have a stronger fault tolerance capability, and the receive end can find a bit error occurring in any one of the 4 bits in a timely manner, so that the receive end is prevented from processing a faulty data packet as a correct data packet, thereby improving transmission reliability.

In a possible design, the OTN transmission frame is a flexible optical service unit OSUflex frame.

In a possible design, a length of the OSUflex frame is 192 bytes, 240 bytes, 128 bytes, or 64 bytes. The transcoding solution provided in this embodiment of this application is applicable to OSUflex frames of a plurality of lengths, so that compatibility is improved.

In a possible design, the check information is cyclic redundancy check CRC information.

In a possible design, the check information is one or more backups of the control information.

In a possible design, a bit rate of the service data information is equal to a rate corresponding to the payload area of the OTN transmission frame.

In a possible design, the bit rate of the service data information is a rate obtained after an idle code block is added or deleted to perform rate adaption, and the bit rate of the service data information obtained after rate adaptation is equal to the rate corresponding to the payload area of the OTN transmission frame. In the foregoing design, the idle code block is used to enable the bit rate of the service data information to adapt to the rate of the payload area of the OTN transmission frame, so that bandwidth utilization is maximized.

According to a second aspect, an embodiment of this application provides a service processing method. The method includes: receiving an optical transport network OTN transmission frame, where the OTN transmission frame is used to carry encoded service data, and the encoded service data includes control information and service data information; obtaining the control information and check information of the control information from an overhead area of the OTN transmission frame, and checking the control information based on the check information; if a check result is correct, obtaining the service data information from a payload area of the OTN transmission frame, and reassembling the control information and the service data information to obtain the encoded service data; and decoding the encoded service data to obtain service data.

For beneficial effects of the second aspect, refer to the descriptions of the first aspect. Details are not described herein again.

In a possible design, the service data is packet data, and the packet data is medium access control MAC frame data, an Internet protocol IP packet, a multi-protocol label switching MPLS packet, a flexible Ethernet FlexE service code block stream, or a 66b code block stream.

In a possible design, the decoding the encoded service data includes: performing 64b/66b decoding on the encoded service data to obtain the service data.

In a possible design, the decoding the encoded service data includes: performing 256b/257b decoding on the encoded service data to obtain a 66b code block stream; and performing 64b/66b decoding on the 66b code block stream to obtain the service data.

In a possible design, the service data is a 66b code block stream, and the decoding the encoded service data specifically includes: performing 256b/257b decoding on the encoded service data to obtain the service data.

In a possible design, the control information includes a code block type indication.

In a possible design, when the code block type indication indicates that a 257b code block in which the code block type indication is located is a control code block, before the performing 256b/257b decoding on the encoded service data, the method further includes:

decoding a second code block pattern indication included in the encoded service data into a first code block pattern indication, where the first code block pattern indication is used to indicate a pattern of a 66b code block included in a code block in which the first code block type indication is located, and a minimum Hamming distance between different values of the second code block pattern indication is 2.

In a possible design, the performing 256b/257b decoding on the encoded service data includes: decoding the encoded service data to obtain a third code block pattern indication, where the third code block pattern indication is used to indicate a pattern of a 66b code block included in a 257b code block in which the third code block pattern indication is located, and a minimum Hamming distance between different values of the third code block pattern indication is 2.

In a possible design, the OTN transmission frame is a flexible optical service unit OSUflex frame.

In a possible design, a length of the OSUflex frame is 192 bytes, 240 bytes, 128 bytes, or 64 bytes.

In a possible design, the check information is CRC check information.

In a possible design, the check information is one or more backups of the control information.

In a possible design, a bit rate of the service data information is equal to a rate corresponding to the payload area of the OTN transmission frame.

According to a third aspect, an embodiment of this application provides a service processing apparatus. The apparatus is applied to an OTN device. The apparatus includes a processor and a memory. The memory is configured to store program code. The processor is configured to read and execute the program code stored in the memory to implement the method according to any one of the first aspect and the designs of the first aspect or implement the method according to any one of the second aspect and the designs of the second aspect.

According to a fourth aspect, an embodiment of this application provides an OTN device. The OTN device includes the apparatus according to the third aspect and an optical transceiver. The optical transceiver is configured to receive an OTN transmission frame sent by the apparatus and send the OTN transmission frame, or is configured to receive an OTN transmission frame and send the OTN transmission frame to the apparatus.

According to a fifth aspect, an embodiment of this application provides a computer-readable storage medium. The storage medium stores a software program. When the software program is read and executed by one or more processors, the method provided in any design of the first aspect or the second aspect may be implemented.

According to a sixth aspect, an embodiment of this application provides a computer program product including instructions. When the computer program product runs on a computer, the computer performs the method provided in any design of the first aspect or the second aspect.

According to a seventh aspect, an embodiment of this application provides a chip. The chip is connected to a memory, and is configured to read and execute a software program stored in the memory, to implement the method provided in any design of the first aspect or the second aspect.

BRIEF DESCRIPTION OF THE DRAWINGS

FIG. 3 is a possible schematic flowchart of a service processing method according to an embodiment of this application;

FIG. 4 is a schematic diagram of a structure of an OSUflex frame according to an embodiment of this application;

FIG. 5 is a possible schematic diagram of a 257b data code block according to an embodiment of this application;

FIG. 11 is a possible schematic flowchart of a service processing method according to an embodiment of this application;

FIG. 12 is a possible schematic diagram of a structure of a service processing apparatus according to an embodiment of this application;

DETAILED DESCRIPTION OF ILLUSTRATIVE EMBODIMENTS

Figure 1:
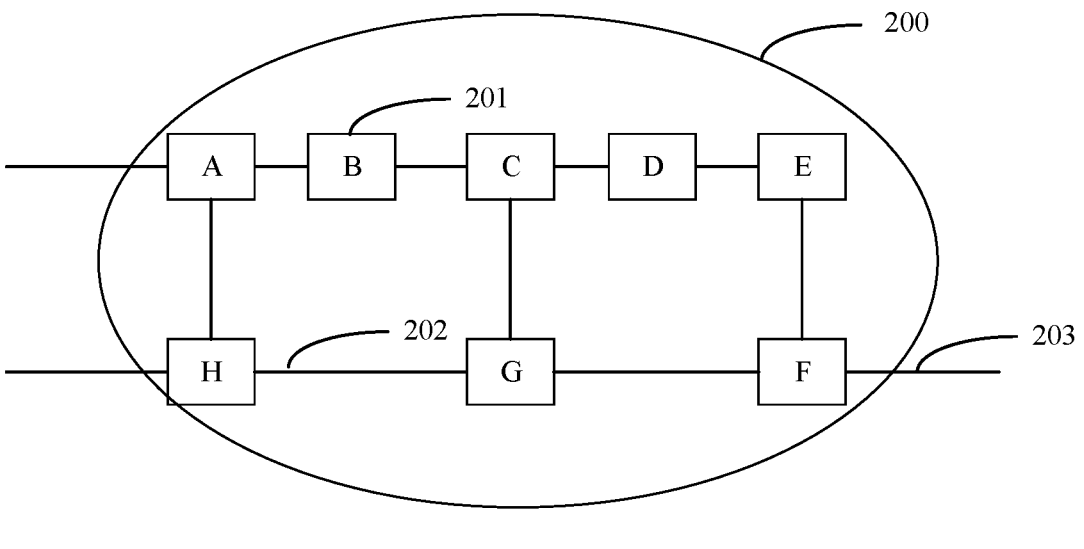
FIG. 1 is a possible schematic diagram of an OTN network architecture according to an embodiment of this application.

Embodiments of this application are applicable to an optical network such as an OTN. One OTN is usually formed by connecting a plurality of devices by using an optical fiber, and may constitute different topology types such as a linear topology, a ring topology, and a mesh topology based on specific requirements. FIG. 1 is a possible schematic diagram of an OTN network architecture according to an embodiment of this application. As shown in FIG. 1, an OTN 200 includes eight OTN devices 201, namely, devices A to H. 202 indicates an optical fiber, configured to connect two devices. 203 indicates a customer service interface, configured to receive or send customer service data. One OTN device may have different functions based on an actual requirement. Generally, OTN devices are classified into an optical layer device, an electrical layer device, and an optoelectronic hybrid device. The optical layer device is a device that can process an optical layer signal, for example, an optical amplifier (OA) or an optical add-drop multiplexer (OADM). The OA may also be referred to as an optical line amplifier (OLA), and is mainly configured to amplify an optical signal, to support transmission over a longer distance without compromising specific performance of the optical signal. The OADM is configured to perform space transformation on an optical signal, so that the optical signal can be output from different output ports (which are sometimes referred to as directions). The electrical layer device is a device that can process an electrical layer signal, for example, a device that can process an OTN signal. The optoelectronic hybrid device is a device capable of processing an optical layer signal and an electrical layer signal. It should be noted that a plurality of different functions may be integrated into one OTN device based on a specific integration requirement. The technical solution provided in this application is applicable to OTN devices, of different forms and integrations, that include an electrical layer function.

Figure 2:
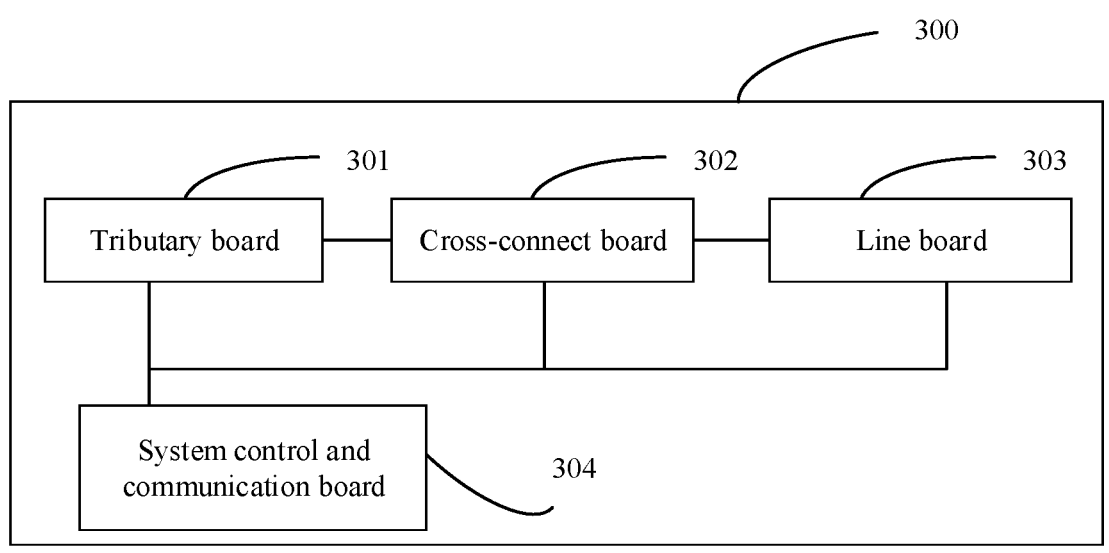
FIG. 2 is a possible schematic diagram of a structure of an OTN device according to an embodiment of this application.

FIG. 2 is a possible schematic diagram of a structure of an OTN device according to an embodiment of this application. For example, the OTN device is the device A in FIG. 1. Specifically, an OTN device 300 includes a tributary board 301, a cross-connect board 302, a line board 303, an optical layer processing board (not shown in the figure), and a system control and communication board 304. Network devices may include different types of boards of different quantities based on a specific requirement. For example, a network device serving as a core node includes no tributary board 301. For another example, a network device serving as an edge node includes a plurality of tributary boards 301, or includes no optical cross-connect board 302. For still another example, a network device supporting only an electrical layer function may include no optical layer processing board.

The tributary board 301, the cross-connect board 302, and the line board 303 are configured to process an electrical layer signal of an OTN. The tributary board 301 is configured to receive and send various customer services such as an SDH service, a packet service, an Ethernet service, and a forward service. Further, the tributary board 301 may be divided into an optical module on a client side and a signal processor. The optical module on the client side may be an optical transceiver, configured to receive and/or send service data. The signal processor is configured to map service data to a data frame and demap the service data from the data frame. The cross-connect board 302 is configured to exchange data frames, to complete exchanging one or more types of data frames. The line board 303 mainly processes a data frame on a line side. Specifically, the line board 303 may be divided into an optical module on the line side and a signal processor. The optical module on the line side may be an optical transceiver on the line side, configured to receive and/or send a data frame. The signal processor is configured to multiplex and demultiplex a data frame on the line side, or map and demap a data frame on the line side. The system control and communication board 304 is configured to implement system control. Specifically, the system control and communication board 304 may collect information from different boards by using a backplane or send a control instruction to a corresponding board. It should be noted that, unless otherwise specified, there may be one or more specific components (for example, signal processors). This is not limited in this application. It should be further noted that a type of a board included in the device, a function design of the board, and a quantity of boards are not limited in this application. It should be noted that during specific implementation, two boards mentioned above may be designed as one board. In addition, the network device may further include a standby power supply, a heat dissipation fan, and the like.

Technical concepts in embodiments of this application are first described below.

64B/66B encoding encodes 64-bit service data or control information of 64 bits corresponding to service data into a 66-bit code block for transmission. The 66-bit code block is simply referred to as a 66b code block. It should be noted that in this embodiment of this application, 66b, 64b/66b, and the like may also be expressed as 66B and 64B/66B, and the name is not specifically limited in this application. The first 2 bits of the 66b code block indicate a synchronization header, mainly used for data alignment and synchronization of receiving a data bitstream at a receive end. There are two types of synchronization headers: "01" and "10". "01" indicates that the 66b code block is a 66b data code block, and 64 bits following the synchronization header carry service data. "10" indicates that the 66b code block is a 66b control code block, and 64 bits following the synchronization header includes mixed data including data and control information. 8 bits in the 66b control code block that are next to the synchronization header are a type field, and subsequent 56 bits include control information or mixed data of control information and data of the 64 bits. The 66b control code block may be a start code block, a tail code block, an idle (IDLE) code block, or the like.

A data frame structure used by an OTN device is an OTN frame. The OTN frame may also be referred to as an OTN transmission frame. The OTN frame is used to carry various service data, and provides rich management and monitoring functions. The OTN frame may be a flexible optical service unit (OSUflex) frame, and the OSUflex frame may also be simply referred to as an OSU frame. Alternatively, the OTN frame may be an optical data unit k (ODUk) frame, an ODUCn frame, an ODUflex frame, an optical transport unit k (OTUk) frame, an OTUCn frame, a flexible OTN (FlexO) frame, or the like. A difference between the ODU frame and the OTU frame lies in that the OTU frame includes the ODU frame and an OTU overhead; k represents different rate levels, where for example, k=1 indicates 2.5 Gbps, and k=4 indicates 100 Gbps; and Cn indicates a variable rate, specifically a rate that is a positive integer multiple of 100 Gbps. Unless otherwise noted, the ODU frame is any one of the ODUk frame, the ODUCn frame, and the ODUflex frame, and the OTU frame is any one of the OTUk frame, the OTUCn frame, and the FlexO frame. It should be further noted that with development of an OTN technology, a new type of OTN frame may be defined, and the new type of OTN frame is also applicable to this application.

Ceiling(x) indicates a ceiling function, used to return a minimum integer value greater than or equal to x.

A Hamming distance is used in a data transmission error control code. The Hamming distance indicates different quantities of a corresponding bit in two words (of a same length), and $d(x, y)$ is used to indicate a Hamming distance between two words x and y. For example, an exclusive OR operation is performed on two strings, and a quantity of results that are 1 is counted. In this case, the quantity is a Hamming distance. That a minimum Hamming distance is 2 means that a minimum value of a Hamming distance between two words of a same length is 2, in other words, a Hamming distance between two words of a same length is greater than or equal to 2.

"A plurality of" refers to two or more than two. "and/or" describes an association relationship between associated objects. There may be three relationships. For example, A and/or B may represent the following three cases: Only A exists, both A and B exist, and only B exists.

The terms used in embodiments of the present invention are merely for the purpose of illustrating specific embodiments, and are not intended to limit the present invention. The terms "a", "said" and "the" of singular forms used in embodiments and the appended claims of the present invention are also intended to include plural forms, unless otherwise specified in the context clearly.

Although terms "first", "second", "third", and the like may be used in embodiments of the present invention to describe various messages, requests, and network devices, the messages, the requests, and the network devices are not limited by the terms. These terms are merely used to distinguish between the messages, the requests, and the network devices. For example, without departing from the scope of embodiments of the present invention, a first network device may also be referred to as a second network device, and similarly, the second network device may also be referred to as the first network device.

Because a bandwidth waste exists in mapping manners of a GFP-F and an IMP, bandwidth needs to be operated in a refined manner in the future as service traffic increases, and especially a packet service serves as a mainstream bearer service of an OTN, this application provides a service processing method and apparatus, to improve bandwidth utilization.

With reference to the accompanying drawings, the following separately describes in detail the solutions provided in embodiments of this application from perspectives of a transmit end and a receive end.

FIG. 3 is a possible schematic flowchart of a service processing method according to an embodiment of this application. The service processing method may be applied to a transmit end. As shown in FIG. 3, the service processing method includes S301 to S305. For example, an OTN device at the transmit end may perform a procedure of the service processing method. Specifically, a processor, a chip, a chip system, a module with a service processing function, or the like in the OTN device at the transmit end may perform S301 to S304.

The OTN device may directly perform S305, that is, send an OTN transmission frame, by using an optical transceiver (which is sometimes an optical transceiver module).

S301: Obtain service data.

For example, a service to which the service data belongs may be a packet service or a service of a fixed bit rate. The packet service is usually represented by PKT. For example, the packet service may be usually a medium access control (MAC) frame data stream, or may be an IP packet data stream (also referred to as an IP packet). The packet service may be alternatively a multi-protocol label switching (MPLS) packet data stream or a flexible Ethernet (FlexE) service code block stream. Alternatively, packet service may be a 66b code block stream formed after 64b/66b (where b indicates bit) encoding. The service of the fixed bit rate is a 66b code block stream formed after 64b/66b encoding.

S302: Encode the service data to obtain encoded service data, where the encoded service data includes control information and service data information.

When the service data is encoded to obtain the encoded service data, any one of the following Manners 1 to 3 may be used. It should be understood that the following several manners are described only as examples in this application, and manners are not exhaustively described.

Manner 1: If the service data is a 66b code block stream, when the service data is encoded to obtain the encoded service data, the 66b code block stream may be transcoded to obtain a Qb code block stream. Q=256K+1 or Q=256K+1*K, and K is a positive integer. For example, K is 1, and Q=257. That is, the 66b code block stream is transcoded to obtain a 257b code block stream. For another example, K is 2, and Q=513/514. That is, the 66b code block stream is transcoded to obtain a 513b or 514b code block stream. In subsequent descriptions, an example in which 256b/257b encoding processing is performed on the 66b code block stream to obtain a 257b code block stream is used. The 257b code block stream is the encoded service data.

Manner 2: If the service data is a non-66b code block stream, when the service data is encoded to obtain the encoded service data, 64b/66b encoding processing may be first performed on the service data to obtain a 66b code block stream. Then 256b/257b encoding processing is performed on the 66b code block stream to obtain a 257b code block stream.

The non-66b code block stream may be a MAC frame data stream, an IP packet data stream, an MPLS packet data stream, or a FlexE service code block stream.

Manner 3: If the service data is a non-66b code block stream, when the service data is encoded to obtain the encoded service data, 64b/66b encoding processing may be first performed on the service data to obtain a 66b code block stream. The 66b code block stream is the encoded service data.

Figure 6:
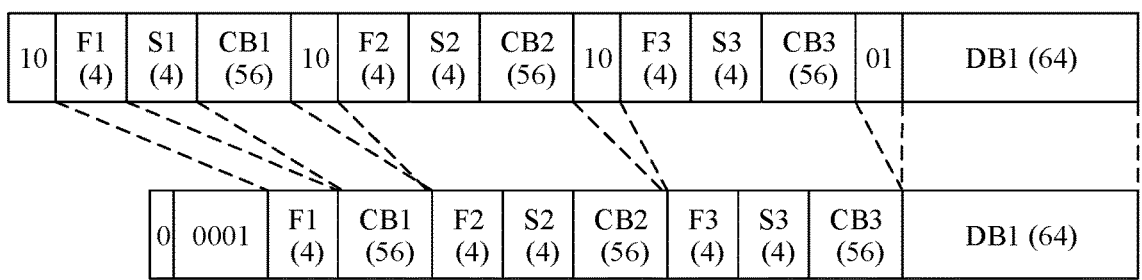
FIG. 6 is another possible schematic diagram of a 257b control code block according to an embodiment of this application.

A manner of encoding the 66b code block stream into the 257b code block stream is subsequently described in detail. Refer to FIG. 6 and related descriptions. Details are not repeatedly described herein.

S303: Map the control information to an overhead area of an OTN transmission frame, check the control information to obtain check information, and map the check information to the overhead area of the OTN transmission frame.

The check information may include CRC information; or the check information may be one or more backups of the control information.

For example, the control information may include a code block type indication. In an example in which the encoded service data is a 257b code block stream, the code block type indication is used to indicate a code block type of a 257b code block carrying the code block type indication, for example, is used to indicate that the 257b code block is a control code block or a data code block. In other words, the code block type indication is mapped to the overhead area of the OTN transmission frame.

S304: Map the service data information to a payload area of the OTN transmission frame.

S305: Send the OTN transmission frame carrying the encoded service data.

For example, if the OTN transmission frame is an OSU-flex frame, the OSUflex frame may be directly sent by using an optical transceiver (which is sometimes an optical transceiver module); or the OSUflex frame may be first mapped to another OTN frame (for example, an ODU frame or a FlexO frame), and then the another OTN frame may be sent by using an optical transceiver module. This is not specifically limited in this embodiment of this application.

In this embodiment of this application, a bit rate of the service data information is equal to a rate of the payload area of the OTN transmission frame, in other words, a transmission rate of the encoded service data is adapted to the rate of the payload area of the OTN transmission frame. For example, rate adaptation may be implemented by using an idle code block (66b IDLE), so that the transmission rate of the finally encoded service data matches the rate of the payload area of the OTN transmission frame.

For example, the OTN transmission frame is an OSUflex frame. FIG. 4 is a schematic diagram of a structure of an OSUflex frame according to an embodiment of this application. As shown in FIG. 4, the structure of the OSUflex frame includes two parts: an overhead area (occupying $W_{OH}$ bits) and a payload area (occupying $W_{PLD}$ bits). The overhead area includes but is not limited to overhead information such as a version identifier, a service identifier, mapping information, and cyclic redundancy check-X bits (CRC-X). The payload area is used to carry service data information. A length of the OSUflex frame has a fixed size. For example, the length of the OSUflex frame is represented by W. In other words, $W=W_{OH}+W_{PLD}$. For example, the length of the OSUflex frame is 192 bytes, 240 bytes, 128 bytes, or 64 bytes.

Assuming that a bit rate of the OSUflex frame is R, a rate to which the packet service needs to be adapted is $R*W_{PLD}/W$, that is, a rate of the payload area of the OSUflex frame. The bit rate R of the OSUflex frame is C times a reference bit rate. The reference bit rate is a preset value, and a value of C is ceiling[(bit rate of the packet service*$W/W_{PLD}$)/reference bit rate]. For example, the reference bit rate may be approximately 2 Mbps, 10 Mbps, or the like, to adapt to various low-rate services that need to be carried in the OTN transmission frame. During calculation, the bit rate of the packet service is a bit rate of valid data, that is, a bit rate corresponding to 64b data (64-bit data other than a 2-bit synchronization header in each 66b code block) in the 66b code block. After the foregoing rate adaptation, the bit rate of the service data information mapped to the OSUflex frame after encoding is adapted to the packet service, to maximize bandwidth utilization.

For example, if the bit rate of the packet service is less than the rate of the payload area of the OSUflex frame, a 66b IDLE code block may be inserted into the 66b code block stream of the packet service. For example, the IDLE code block may be inserted after a code block T and before a code block S. Alternatively, a special code block may be user-defined as a fill code block. A location into which the fill code block is inserted is not limited. The code block T indicates a start code block of the 66b code block stream, and the code block S indicates a tail code block of the 66b code block stream. Taking a MAC frame data stream as an example, after a MAC frame is encoded into a 66b code block stream, a frame header of the MAC frame is encoded into a start code block, and a frame tail of the MAC frame is encoded into a tail code block.

The following describes in detail the manner of converting the 66b code block stream into the 257b code block stream.

In this embodiment of this application, each four 66b code blocks are converted into one 257b code block through encoding. The encoding conversion manner may follow a method defined in IEEE 802.3 or another user-defined encoding conversion method.

In a possible embodiment, the encoding conversion operation includes: deleting 2-bit synchronization headers of four consecutive 66b code blocks to obtain 256b, and adding a 1-bit code block type indication of 256b to obtain a 257b code block. When the code block type indication is a first value, the 257b code block is a data code block; or when the code block type indication is a second value, the 257b code block is a control code block. For example, the first value is 1, and the second value is 0; or the first value is 0, and the second value is 1. All of four 66b code blocks in a 257b data code block are data code blocks, and four 66b code blocks in a 257b control code block include at least one 66b control code block. The code block type indication may be alternatively control information of the 257b code block.

In an example, if all of four 66b code blocks are data code blocks, 2-bit synchronization headers of the four 66b code blocks are directly deleted, and a 1-bit code block type indication is added to obtain a 257b data code block. A value of the code block type indication is the first value. For example, FIG. 5 is a possible schematic diagram of a 257b data code block according to an embodiment of this application. In FIG. 5, an example in which the first value is 1 is used. In FIG. 5, a number in parentheses indicates a quantity of bits, of is a 2-bit synchronization header of a 66b data code block, and DB (data block) indicates valid data of the 66b data code block.

In another example, if four 66b code blocks include at least one 66b control code block, 2-bit synchronization headers of the four 66b code blocks are deleted, and a 1-bit code block type indication is also added. A value of the code block type indication is the second value.

To enable a receive end to know whether the four 66b code blocks are control code blocks or data code blocks, indication information used to indicate a 66b code block pattern further needs to be added to obtain a 257b control code block.

Example 1

An example in which indication information used to indicate a 66b code block pattern is referred to as a first code block pattern indication is used. The first code block pattern indication occupies 4 bits, and the first code block pattern indication is used to indicate patterns of the four 66b code blocks included in the 257b control code block, that is, code block types (including a 66b control code block or a 66b data code block) and code block locations of the four 66b code blocks. In the first code block pattern indication, the $i^{th}$ bit indicates whether the $i^{th}$ 66b code block in the 257b control code block is a data code block or a control code block.

FIG. 6 is another possible schematic diagram of a 257b control code block according to an embodiment of this application. As shown in FIG. 6, 2-bit synchronization headers of the four 66b code blocks are deleted, a 1-bit code block type indication is added, the last 4 bits of an 8-bit type field of the first 66b control code block are deleted, type fields of remaining 66b control code blocks are not deleted or changed, and fully transparent transmission is performed. Further, a 4-bit first code block pattern indication is added to finally obtain the 257b control code block shown in FIG. 6. In FIG. 6, a number in parentheses indicates a quantity of bits, and 10 and 01 are 2-bit synchronization headers of 66b.

01 indicates a 66b data code block, 10 indicates a 66b control code block, and F and S indicate type information of a type field of the 66b control code block. In FIG. 6, an example in which the four 66b code blocks include three 66b control code blocks and one data code block is used. The first to the third 66b code blocks are 66b control code blocks, and the fourth 66b code block is a 66b data code block. In an example in which 1 indicates the 66b data code block and 0 indicates the 66b control code block, a value of the first code block pattern indication is 0001, as shown in FIG. 6.

Example 2

To further improve reliability based on Example 1, bit error tolerance protection may be further performed on the 257b code block obtained by converting the four 66b code blocks through encoding. Specifically, after the four 66b code blocks are converted into the 257b code block through encoding in the manner of Example 1, the first code block pattern indication in the 257b control code block may be further encoded into a second code block pattern indication. A minimum Hamming distance between different values of the second code block pattern indication is 2. It should be understood that encoding may also be understood as replacement performed according to a preset rule or obtaining performed by using a specific algorithm.

For example, Table 1 shows a mapping relationship between different values of the first code block pattern indication and different values of the second code block pattern indication. When a value of the $i^{th}$ bit in the third column in Table 1 is 1, it indicates that a 66b code block is a 66b data code block; or when a value of the $i^{th}$ bit is 0, it indicates that a 66b code block is a 66b control code block. It should be understood that Table 1 is only an example of the mapping relationship between different values of the first code block pattern indication and different values of the second code block pattern indication, and does not constitute a specific limitation.

The first column in Table 1 shows an original 66b code block combination pattern before four 66b code blocks form a 257b code block. S indicates a start code block, T indicates a tail code block, I indicates an idle code block, and D indicates a data code block.

Figure 7:
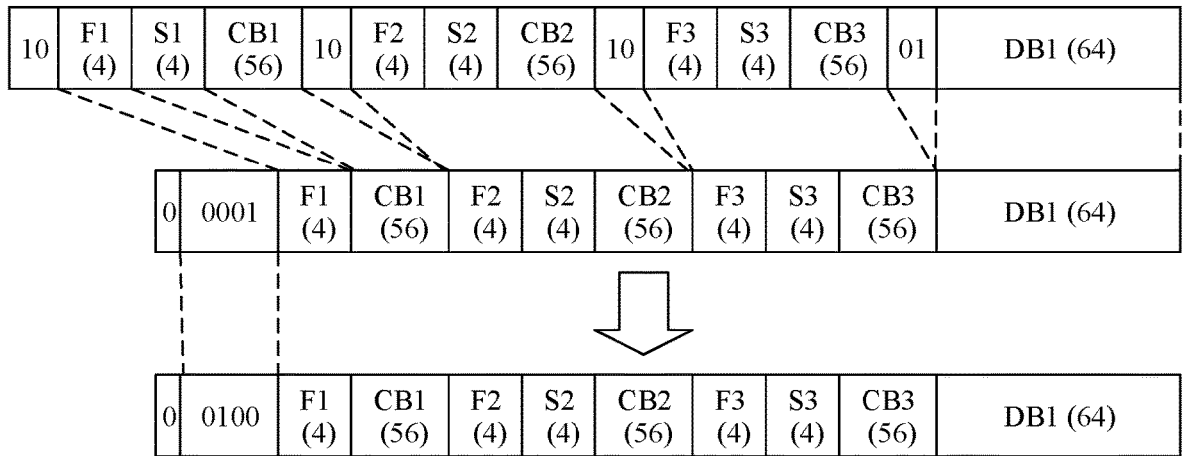
FIG. 7 is still another possible schematic diagram of a 257b control code block according to an embodiment of this application.

FIG. 7 is still another possible schematic diagram of a 257b control code block according to an embodiment of this application. Continuing with the foregoing example of FIG. 6, taking Table 1 as an example, the 257b control code block in FIG. 7 is obtained by encoding, into 0100, a value 0001 of a first code block pattern indication of the second bit to the fifth bit in the 257b control code block shown in FIG. 6.

In the foregoing embodiment, the first code block pattern indication used to indicate the patterns of the 66b code blocks in the 257b control code block is further encoded into the second code block pattern indication whose minimum Hamming distance is 2, so that it is ensured that the 4 bits indicating information about the patterns of the 66b code blocks in the 257b control code block have a stronger fault tolerance capability, and a bit error occurring in any one of the 4 bits can be found in a timely manner.

TABLE 1

| 66b code block combination | Code block type indication of a 257b code block code block | First code block pattern indication | Second code block pattern indication (whose minimum Hamming distance is 2) |
|---|---|---|---|
| D D D D | 1 | Not involved | Not involved |
| I I I I | 0 | 0000 | 0100 |

TABLE 1-continued

| 66b code block combination | Code block type indication of a 257b code block | First code block pattern indication | Second code block pattern indication (whose minimum Hamming distance is 2) |
|---|---|---|---|
| T I I S | 0 | | |
| T I I I | 0 | | |
| T I S D | 0 | 0001 | 0001 |
| T S D D | 0 | 0011 | 0010 |
| S D D D | 0 | 0111 | 0111 |
| D T I S | 0 | 1000 | 1000 |
| D T I I | 0 | | |
| D T S D | 0 | 1001 | 1011 |
| D D T S | 0 | 1100 | 1101 |
| D D T I | 0 | | |
| D D D T | 0 | 1110 | 1110 |

Example 3

An example in which indication information used to indicate a 66b code block pattern is referred to as a third code block pattern indication is used. The third code block pattern indication occupies 4 bits, and the first code block pattern indication is used to indicate patterns of the four 66b code blocks, that is, code block types (including a 66b control code block or a 66b data code block) and code block locations of the four 66b code blocks. 66b code block combinations of different code block types correspond to different values of the third code block pattern indication. A minimum Hamming distance between different values of the third code block pattern indication is 2, as shown in Table 2, for example.

TABLE 2

| 66b code block combination | Code block type indication of a 257b code block | Third code block pattern indication (whose minimum Hamming distance is 2) |
|---|---|---|
| D D D D | 1 | Not involved |
| I I I I | 0 | 0100 |
| T I I S | 0 | |
| T I I I | 0 | |
| T I S D | 0 | 0001 |
| T S D D | 0 | 0010 |
| S D D D | 0 | 0111 |
| D T I S | 0 | 1000 |
| D T I I | 0 | |
| D T S D | 0 | 1011 |
| D D T S | 0 | 1101 |
| D D T I | 0 | |
| D D D T | 0 | 1110 |

Figure 8:
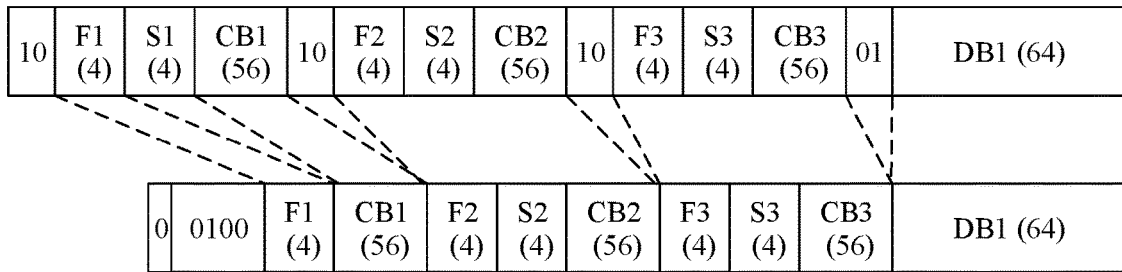
FIG. 8 is still another possible schematic diagram of a 257b control code block according to an embodiment of this application.

FIG. 8 is still another possible schematic diagram of a 257b control code block according to an embodiment of this application. As shown in FIG. 8, 2-bit synchronization headers of the four 66b code blocks are deleted, a 1-bit code block type indication is added, the last 4 bits of an 8-bit type field of the first 66b control code block are deleted, type fields of remaining 66b control code blocks are not deleted or changed, and fully transparent transmission is performed. Further, a 4-bit third code block pattern indication is added to finally obtain the 257b control code block shown in FIG. 8. In FIG. 8, a number in parentheses indicates a quantity of bits, and 10 and 01 are 2-bit synchronization headers of 66b. 01 indicates a 66b data code block, 10 indicates a 66b control code block, and F and S indicate type information of a type field of the 66b control code block. In FIG. 8, an example in which the four 66b code blocks include three 66b control code blocks and one data code block is used. The first to the third 66b code blocks are 66b control code blocks, and the fourth 66b code block is a 66b data code block. Taking a mapping relationship, shown in Table 2, between a 66b code block combination and a value of the third code block pattern indication as an example, a value of the third code block pattern indication is moo, as shown in FIG. 8.

In this embodiment of this application, when the 66b code block stream is encoded, the 66b code block stream may be further converted into a code block stream in another format through encoding, for example, encoded into a 513b code block stream or a 514b code block stream.

For example, the 66b code block stream is encoded into the 513b code block stream, and each eight 66b code blocks may be converted into one 513b code block through encoding. 2-bit synchronization headers of eight consecutive 66b code blocks are deleted to obtain 512b, and a 1-bit code block type indication of 512b is added to obtain a 513b code block. When the code block type indication is a first value, the 513b code block is a 513b data code block; or when the code block type indication is a second value, the 513b code block is a 513b control code block. All of eight 66b code blocks in the 513b data code block are data code blocks, and eight 66b code blocks in the 513b control code block include at least one 66b control code block.

For the 513b control code block, to enable a receive end to know whether the eight 66b code blocks are control code blocks or data code blocks, indication information used to indicate a 66b code block pattern further needs to be added to obtain a 513b control code block. For example, 4 bits or 8 bits may be occupied. For example, when there is only one control code block, the last 4 bits of an 8-bit type field of the first 66b control code block may be deleted; or when there are two or more control code blocks, the last 4 bits of an 8-bit type field of each of the first and the second 66b control code blocks may be deleted, type fields of remaining 66b control code blocks are not deleted or changed, and fully transparent transmission is performed. Further, 4-bit or 8-bit indication information used to indicate a 66b code block pattern is added to finally obtain a 513b control code block. A manner of configuring the 4-bit or 8-bit indication information used to indicate the 66b code block pattern is similar to the 4-bit indication information that is in the 257b control code block and that is used to indicate the 66b code block pattern. For example, a form of the first code block pattern indication is used, a form of the third code block pattern indication is used, or a form of the second code block pattern indication obtained by further encoding the first code block pattern indication is used.

For example, the 66b code block stream is encoded into the 514b code block stream, and each eight 66b code blocks may be converted into one 514b code block through encoding. 2-bit synchronization headers of eight consecutive 66b code blocks are deleted to obtain 512b, and a 2-bit code block type indication of 512b is added to obtain a 514b code block. For example, the first bit indicates a code block type of a first combination (256 bits) including the first to the fourth 66b code blocks, and the second bit indicates a code block type of a second combination (256 bits) including the fifth to the eighth 66b code blocks. For example, if the first bit is 1, the first combination includes four 66b data code blocks; or if the first bit is 0, at least one of the four 66b code blocks included in the first combination is a 66b control code block. If the first combination and the second combination include four 66b control code blocks, a code block pattern indication (for example, the first code block pattern indication, the second code block pattern indication, or the third code block pattern indication) may be added in a same manner as in the 257b control code block. Details are not described herein again.

The following describes, by using an example in which the encoded service data is a 257b code block stream, mapping the control information of the encoded service data and the check information of the control information to the overhead area of the OTN transmission frame and mapping the service data information to the payload area of the OTN transmission frame.

Figure 9:
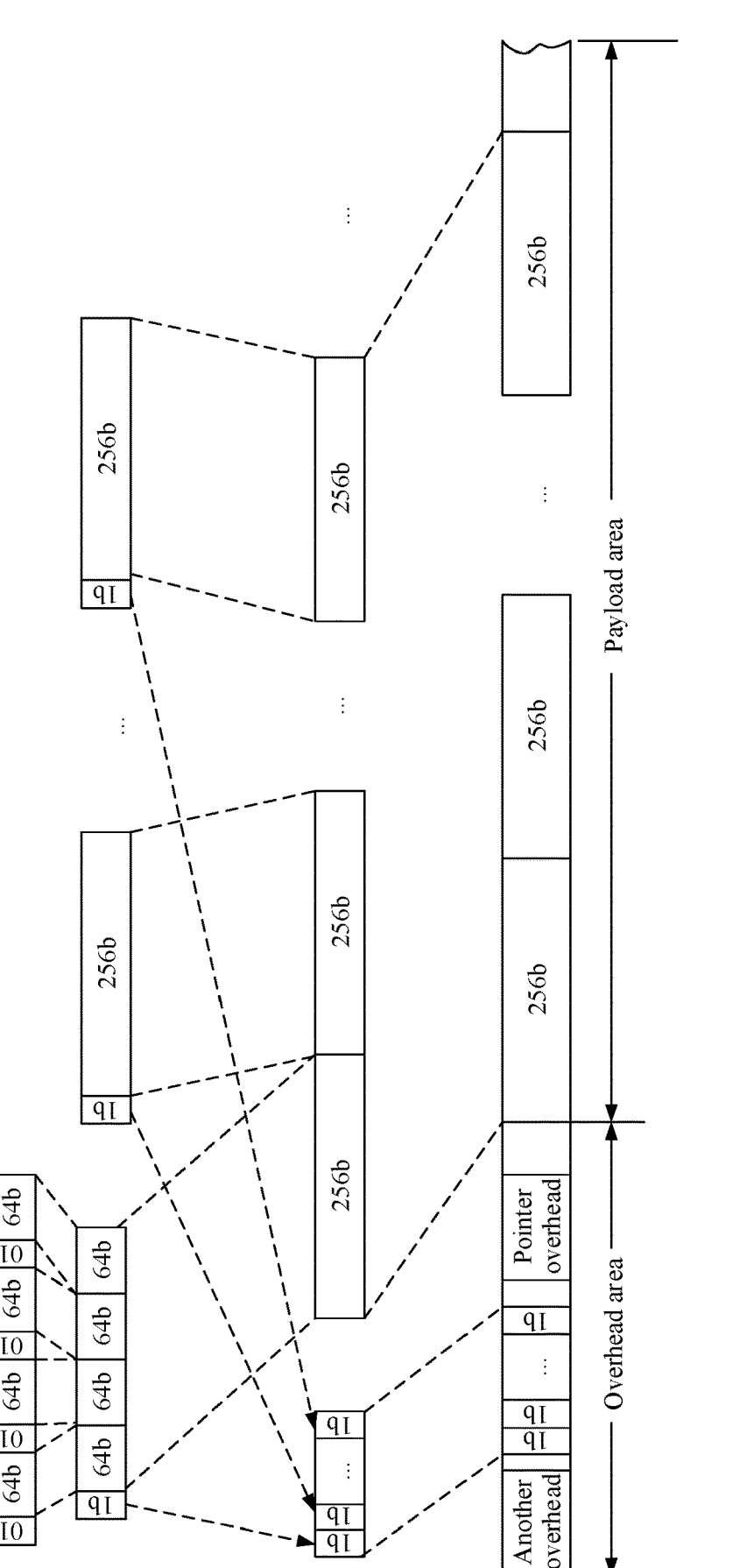
FIG. 9 is a possible example diagram of mapping a 257b code block stream to an OSUflex frame according to an embodiment of this application.

The code block type indication in the 257b code block is mapped to the overhead area of the OSUflex frame, and CRC check is performed. Information other than the code block type indication is mapped to the payload area of the OSUflex frame. For ease of description, the code block type indication is referred to as a first part of the 257b code block, and the information other than the code block type indication in the 257b code block is referred to as a second part. For example, for the 257b data code block, the code block type indication is the first part, and remaining service data information is the second part. For another example, for the 257b control code block, the code block type indication is the first part, and remaining service data information and a remaining code block pattern indication (the first code block pattern indication, the second code block pattern indication, or the third code block pattern indication) are the second part. For example, refer to FIG. 9. FIG. 9 is a possible example diagram of mapping a 257b code block stream to an OSUflex frame according to an embodiment of this application.

For example, the code block type indication occupies 1 bit. Specifically, the transmit end maps the continuous 257b code block stream to the OSUflex frame. A 1-bit code block type indication of each 257b code block is separated from a remaining 256-bit second part. The 1-bit first part (code block type indication) of the 257b code block is mapped to the overhead area of the OSUflex frame. The remaining 256-bit second part of the 257b code block is mapped to the payload area of the OSUflex frame.

As described above, rate adaptation has been performed on the 66b code block stream. Therefore, a bit rate corresponding to the second part of the 257b code block is exactly equal to the bit rate of the payload area of the OSUflex frame. The second part is mapped to the payload area of the OSUflex frame through bit synchronization mapping. A 256-bit second part of each 257b code block is 32 bytes, and the second part is aligned with a payload boundary byte of the OSUflex frame.

In a possible implementation, before S305 of sending an OTN transmission frame carrying the encoded service data, start location information corresponding to the first complete 257b code block mapped to the payload area of the OSUflex frame is placed in the overhead area of the OSUflex frame. The start location information may also be referred to as a pointer overhead. The receive end can find, based on the pointer overhead, a start location of the first complete 257b code block carried in the payload area of the OSUflex frame, to restore 256 bits of each 257b code block carried in the payload area of the OSUflex frame. The receive end can also know, based on the pointer overhead, a quantity of 257b code blocks whose start bytes are included in the payload area of the current OSUflex frame, in other words, know a quantity of 257b code blocks whose code block type indications are included in the overhead area of the OSUflex frame.

In a possible implementation, the transmit end may further perform cyclic redundancy check (CRC-X) on the code block type indication of the 257b code block and the pointer overhead that are included in the overhead area of the OSUflex frame, to generate X-bit cyclic redundancy check information, and add the X-bit cyclic redundancy check information to the overhead area of the OSUflex frame. It should be noted that the transmit end may separately perform CRC-X on the code block type indication of the 257b code block and the pointer overhead, or may perform CRC-X on the code block type indication of the 257b code block and the pointer overhead together. CRC-X performed on the code block type indication and the pointer overhead may be independent of CRC-X performed on another overhead of the OSUflex frame. The transmit end may alternatively jointly perform a CRC-X operation on the code block type indication, the pointer overhead, and another overhead on which CRC-X needs to be performed, so that overhead information in the OSUflex frames shares same CRC-X check, thereby further reducing bandwidth and reducing processing complexity.

A line bit error may occur in a line transmission process. If a complete 257b code block is mapped to the payload area as a whole, and a bit error exactly occurs in 1-bit code block type information of a 257b code block, for example, the 1-bit code block type information changes from 0 to 1, the receive end may mistakenly consider the 257b control code block as a 257b data code block, and directly convert the 257b control code block into four 66b data code blocks through decoding. Correspondingly, a received faulty packet is processed as a correct packet in the packet service, in other words, a reliability problem is caused. In this application, the first part (the code block type indication) and the second part (remaining 256 bits) of the 257b code block are separately mapped, and the code block type indication is placed in the overhead area of the OSUflex frame to perform CRC-X, in other words, bit error protection is performed on the code block type indication. When a bit error occurs in the line transmission process, for example, an error occurs in the code block type indication of the 257b code block, the error can be found in a timely manner by using CRC-X check information, so that the 257b code block corresponding to the code block type indication is discarded, and the case in which a received faulty packet is processed as a correct packet in the packet service is avoided, thereby improving transmission reliability.

Optionally, if the 66b code block stream obtained after rate adaptation is converted, through encoding, into a code block stream in another format, for example, a 513b code block stream or a 514b code block stream, control information and service data information of the 513b code block stream or the 514b code block stream are correspondingly mapped. For example, for the 513b code block stream, a 1-bit code block type indication of each 513b code block may be mapped to the overhead area of the OSUflex frame, and remaining 512 bits are mapped to the payload area of the OSUflex frame. For the 514b code block stream, a 2-bit code block type indication of each 514b code block may be mapped to the overhead area of the OSUflex frame, and remaining 512 bits are mapped to the payload area of the OSUflex frame. In addition, a pointer overhead also needs to be added to the overhead area of the OSUflex frame to indicate a start location of the first complete code block carried in the payload area of the current OSUflex frame. Then CRC check is performed on code block type indications and pointer overheads of these 513b code blocks mapped to the OSUflex frame, and check information obtained after the CRC check is added to the overhead area of the OSUflex frame.

It should be further noted that the method using CRC to provide reliability is only an example. Alternatively, backups of a plurality of pieces of overhead information may be mapped to the overhead area of the OSUflex frame, and a majority decision may be used to improve reliability.

Figure 10A:
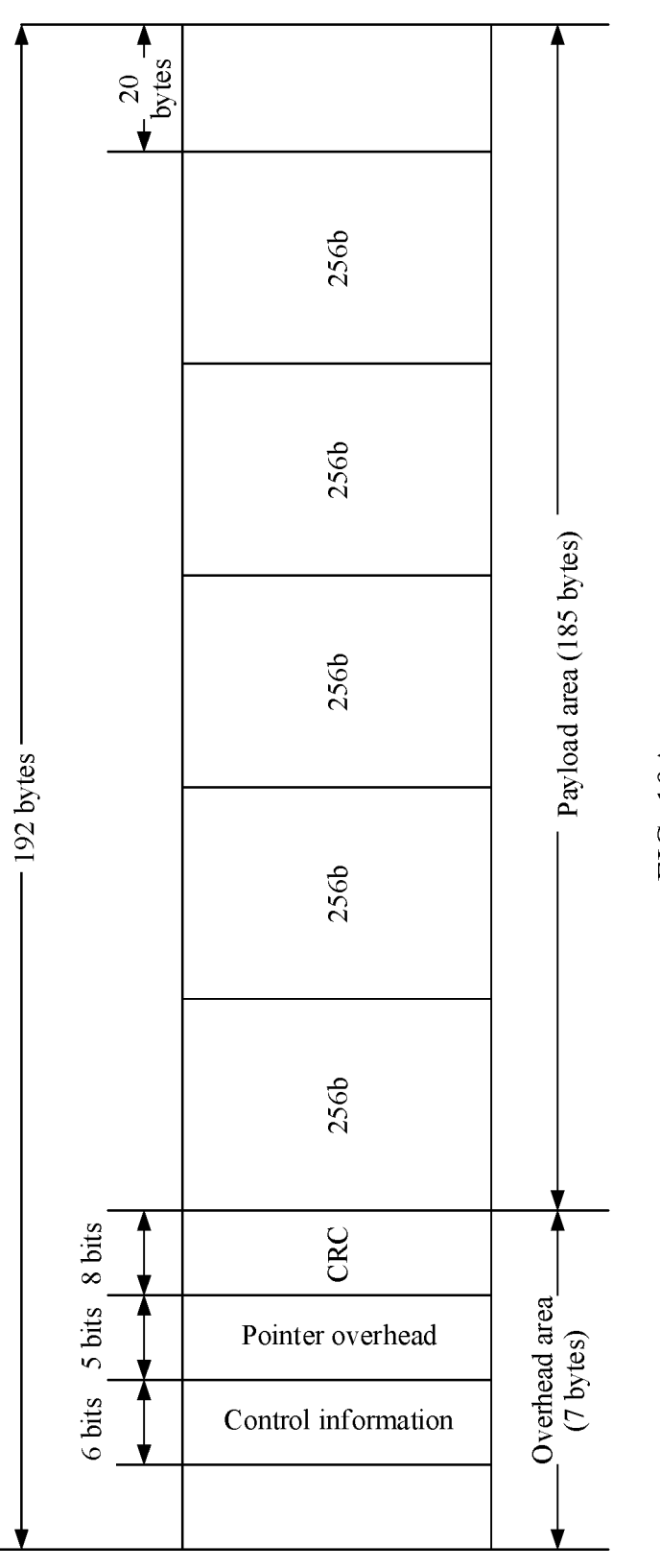
FIG. 10A is a possible schematic diagram of a structure of an OSUflex frame according to an embodiment of this application.
Figure 10B:
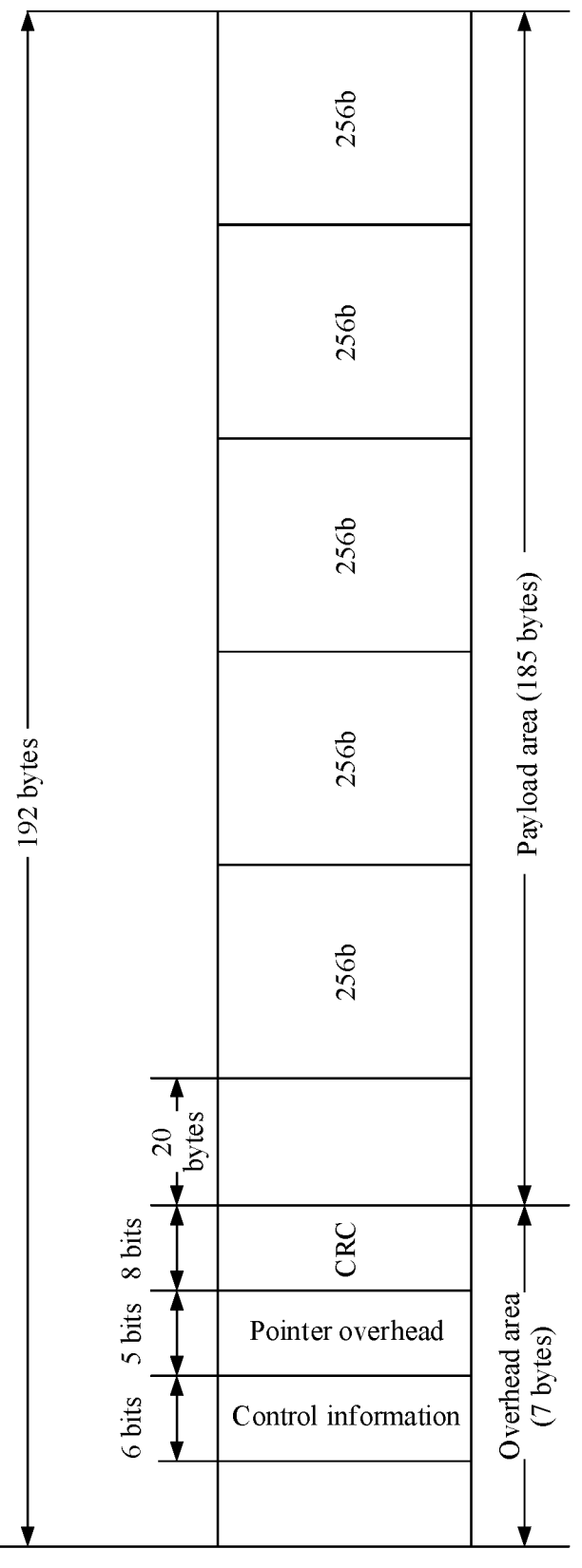
FIG. 10B is a possible schematic diagram of a structure of an OSUflex frame according to an embodiment of this application.
Figure 10C:
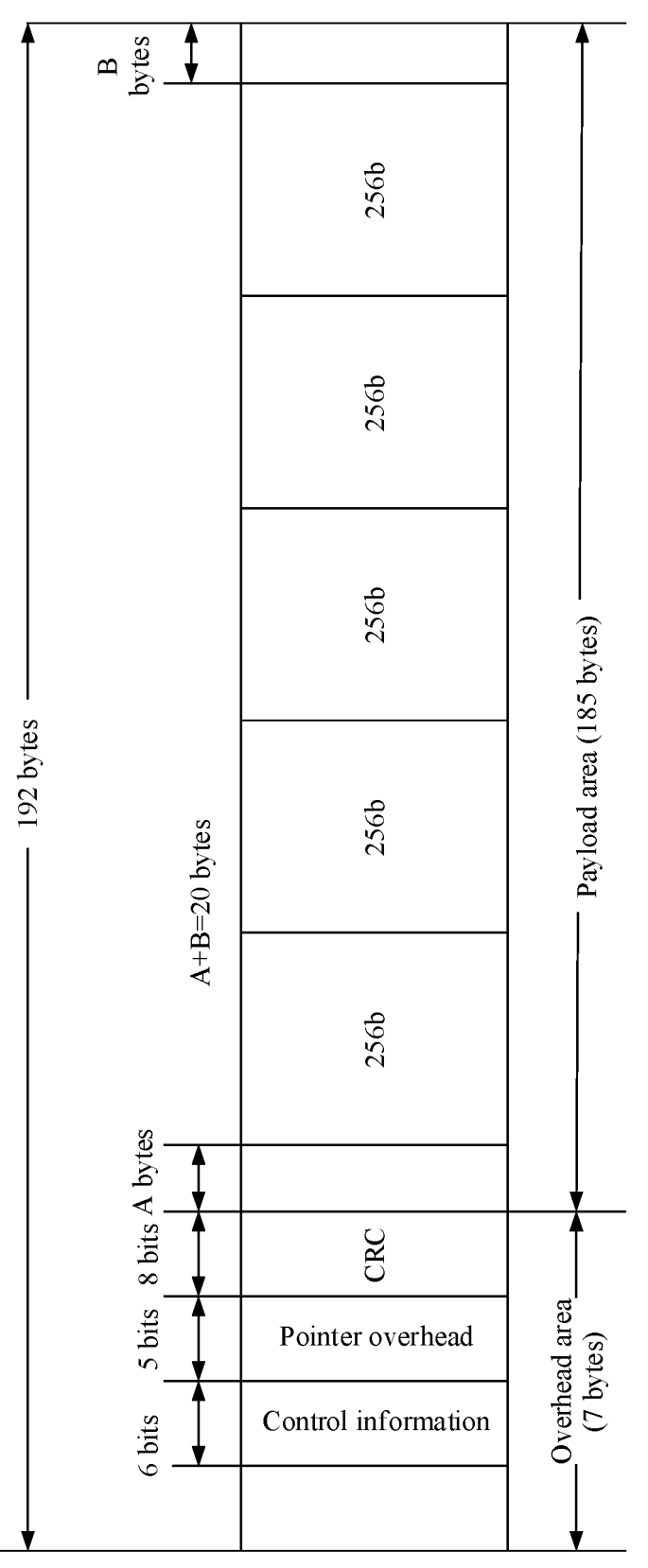
FIG. 10C is a possible schematic diagram of a structure of an OSUflex frame according to an embodiment of this application.

For example, the following uses an example in which an OSUflex frame size is 192 bytes to describe a process of mapping a 257b code block data stream to an OSUflex frame. FIG. 10A, FIG. 10B, and FIG. 10C are possible schematic diagrams of a structure of an OSUflex frame according to an embodiment of this application.

As shown in FIG. 10A, FIG. 10B, and FIG. 10C, the OSUflex frame size is 192 bytes, an overhead area includes 7 bytes, and a payload area is 185 bytes. Second parts of five complete 257b code blocks and 20 bytes included in a second part of one 257b code block may be mapped to a payload area of each OSUflex frame, in other words, 256-bit information corresponding to five complete 257b code blocks and 20 bytes in 256-bit information corresponding to one 257b code block may be mapped to the payload area of each OSUflex frame. It can be learned that in a process of mapping the 257b code block data stream to the OSUflex frame, one 257b code block is placed in two consecutive OSUflex frames. This case may be referred to as cross-frame mapping.

5-bit POINTER[4:0] is reserved in the overhead area of the OSUflex frame, and POINTER indicates a pointer overhead, and is used to indicate a start location corresponding to the first complete 257b code block in the payload area of the OSUflex frame. POINTER[4:0] indicates 5 bits in the POINTER overhead. For example, a value of the pointer overhead ranges from 0 to 31. "0" indicates that the start location of the first complete 257b code block carried in the payload area of the current OSUflex frame is the first byte in the payload area of the OSUflex frame. "1 to 31" respectively indicate that the start location of the first complete 257b code block carried in the payload area of the current OSUflex frame is the second byte to the $32^{nd}$ byte of the payload area of the OSUflex frame. This case is cross-frame mapping. That is, incomplete 257b code block data of 1 to 31 bytes is first mapped to a start part of the payload area of the current frame, and then the first complete 257b code block is mapped.

Correspondingly, code block type information corresponding to the 257b code block mapped to the payload area of the OSUflex frame is mapped to the overhead area of the OSUflex frame. 6-bit 257b_IND[5:0] is reserved in the overhead area of the OSUflex frame, and is specifically used to carry a code block type indication of the 257b code block. 257b_IND[5:0] may also be referred to as an indication overhead, or may be referred to as another name. This is not limited in this application. If six 257b code blocks carried in the current OSUflex frame include start bytes of the six 257b code blocks, for example, as shown in FIG. 10A and FIG. 10C, code block type indications of the corresponding six 257b code blocks are directly placed in 257b_IND[5:0]. If six 257b code blocks carried in the current OSUflex frame include start bytes of five 257b code blocks, for example, as shown in FIG. 10B, only type indications of the 257b code blocks including the start bytes of the five 257b code blocks are placed in 5-bit 257b_IND[4:0] in a 257b_IND overhead.

CRC8 cyclic redundancy check calculation is performed on overhead information such as the control information (257b_IND) and the pointer overhead (POINTER), to generate CRC8 information and place the CRC8 information at a CRC8 overhead location. A check polynomial used for CRC8 calculation includes but is not limited to X8+X2+X+

1, and an initial value is all 1. In addition to detecting errors, CRC8 may use 1 bit for an error correction function.

Specific naming manners of overheads such as the control information (257b_IND), the overhead indication (POINTER), and the check information (CRC8) mentioned in this embodiment of this application and specific overhead locations of the overheads in the overhead area of the OSUflex frame are not limited.

The following describes the solutions provided in embodiments of this application from a perspective of a receive end.

FIG. 11 is a possible schematic flowchart of a service processing method according to an embodiment of this application. The service processing method may be applied to a receive end. It should be understood that, unless otherwise specified, actions performed by the receive end are an inverse process of actions performed on a transmit side. As shown in FIG. 11, the service processing method includes S1101 to S1105. For example, an OTN device at the receive end may perform a procedure of the service processing method. Specifically, a processor, a chip, a chip system, a module with a service processing function, or the like in the OTN device at the receive end may perform S1102 to S1105. Specifically, the OTN device may directly perform S1101, that is, receive an OTN transmission frame, by using an optical transceiver (which is sometimes an optical transceiver module).

S1101: Receive an OTN transmission frame, where the OTN transmission frame is used to carry encoded service data, and the encoded service data includes control information and service data information.

Further, overhead information and check information of an overhead area of the OTN transmission frame are extracted. The overhead information includes control information (including a code block type indication), and may further include an overhead indication. The overhead information is checked based on the check information.

In a manner, if the check information is CRC information, CRC check processing may be performed on the overhead information based on the check information. If a recalculated CRC-X value is the same as a CRC-X value extracted from the overhead area of the OSUflex frame, it is considered that no error occurs in the check information of the overhead area. If a recalculated CRC-X value is different from a CRC-X value extracted from the overhead area of the OSUflex frame, it is considered that a bit error exists in the overhead area, and data carried in a payload area of the OSUflex frame may be directly discarded.

In another manner, if a transmit end sends one or more pieces of same overhead information as check information, it may be determined whether values of the plurality of pieces of overhead information are the same to determine whether an overhead is correct. Specifically, a majority decision may be used, or a decision about whether a plurality of pieces of overhead information are consistent may be used. For example, if there are three same overheads, it may be considered that transmission is correct if the overheads are completely the same, or an overhead value of same overheads of a relatively large quantity is used as a correct value. This is not limited in this application.

In FIG. 11, an example in which control information and check information of the control information are extracted from the overhead area of the OTN transmission frame is used.

S1102: Obtain the control information and the check information of the control information from the overhead area of the OTN transmission frame, and check the control information based on the check information.

For example, if the check information is CRC information, the receive end performs CRC check processing on the control information based on the CRC information. For another example, the check information is one or more backups of the control information, and the one or more pieces of control information in the check information are compared with the control information extracted from the overhead area to determine whether values are the same, to check the control information extracted from the overhead area.

S1103: If a check result is correct, obtain the service data information from the payload area of the OTN transmission frame, and reassemble the control information and the service data information to obtain the encoded service data.

An example in which the OTN transmission frame is an OSUflex frame and the encoded service data is a 257b code block stream is still used. The receive end may obtain, based on a pointer overhead, a start location corresponding to the first complete 257b code block carried in the current OSU-flex frame, and obtain, through parsing, 256-bit data corresponding to each 257b code block. For the OSUflex frame with a size of 192 bytes, a start location of the first complete 257b code block is the first to the $32^{nd}$ bytes of a payload area of the OSUflex frame. Further, the receive end obtains, based on the pointer overhead in an overhead area of the OSUflex frame, a quantity of 257b code blocks whose code block type indications are included in the overhead area of the current OSUflex frame. In other words, after obtaining the pointer overhead, the receive end can determine a quantity of 257b code blocks whose start bytes are included in the payload area of the current OSUflex frame, in other words, know a quantity of 257b code blocks whose code block type indications are included in the overhead area of the OSUflex frame. For the OSUflex frame with the size of 192 bytes, the payload area of the OSUflex frame is 185 bytes. If a value of the pointer overhead is a value in 0 to 24, it indicates that the payload area of the OSUflex frame includes start bytes of six 257b code blocks, in other words, the overhead area of the OSUflex frame includes code block type indications of the six 257b code blocks, and a 6-bit code block type indication is extracted from 257b_IND[5:0]. If a value of the pointer overhead is a value in 25 to 31, it indicates that the payload area of the OSUflex frame includes start bytes of five 257b code blocks, in other words, the overhead area of the OSUflex frame includes type indication information of the five 257b code blocks, and a 5-bit code block type indication is extracted from 257b_IND [4:0].

Further, the obtained code block type indication and 256-bit data corresponding to the payload area are recombined into a 257b code block stream.

Because an obtained 1-bit code block type indication in each 257b code block is obtained after CRC check is performed, it is ensured that no bit error occurs in the obtained 1-bit code block type indication in each 257b code block. Therefore, it is ensured from the source that the following case is avoided: A bit error occurs in the 1-bit code block type indication, the receive end mistakenly considers that the 257b control code block is a 257b data code block, and converts the 257b control code block into four 66b data code blocks through decoding, and correspondingly, a received faulty packet is processed as a correct packet in a packet service. Therefore, transmission reliability is improved.

S1104: Decode the encoded service data to obtain service data.

The decoding process described in S1104 is an inverse process of S302 described in the embodiment corresponding to FIG. 3.

For the three encoding manners described in the embodiment corresponding to FIG. 3, this embodiment provides three decoding manners as examples.

Manner 1: Perform 64b/66b decoding on the encoded service data to obtain the service data.

Manner 2: Perform 256b/257b decoding on the encoded service data to obtain a 66b code block stream, and perform 64b/66b decoding on the 66b code block stream to obtain the service data.

Manner 3: Perform 256b/257b decoding on the encoded service data to obtain the service data.

Based on a same inventive concept as the foregoing embodiments, an embodiment of this application further provides a service processing apparatus. The method, the apparatus, and a system are based on the same inventive concept. Principles of the method, the apparatus, and the system for resolving problems are similar. Therefore, for implementation of the apparatus and the method, mutual reference may be made, and details of repeated parts are not described.

Figure 13:
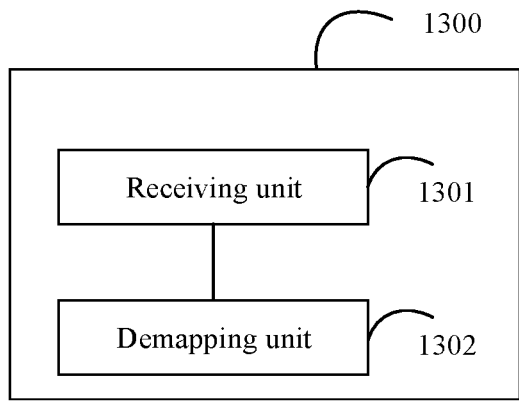
FIG. 13 is another possible schematic diagram of a structure of a service processing apparatus according to an embodiment of this application.

FIG. 12 and FIG. 13 are two possible schematic diagrams of a structure of a service processing apparatus according to an embodiment of this application. A service processing apparatus 1200 shown in FIG. 12 includes a service data obtaining unit 1201, a mapping unit 1202, and a sending unit 1203, separately performing service obtaining, service processing, and sending actions in the foregoing method performed by the OTN device at the transmit end. For example, the service data obtaining unit 1201 is configured to perform S301, the mapping unit 1202 is configured to perform S302 to S304, and the sending unit 1203 is configured to perform S305. A service processing apparatus 1300 shown in FIG. 13 includes a receiving unit 1301 and a demapping unit 1302, separately performing service receiving and demapping actions in the foregoing method of the OTN device at the receive end. For example, the receiving unit 1301 is configured to perform S1101, and the demapping unit 1302 is configured to perform S1102 to S1104.

A person skilled in the art should understand that units included in the apparatus 1200 and the apparatus 1300 may be implemented by using one or more processors.

In embodiments of this application, division into the units is an example, and is merely a logical function division. During actual implementation, another division manner may be used. In addition, functional units in embodiments of this application may be integrated into one processor, or each of the units may exist alone physically, or two or more units are integrated into one unit. The integrated unit may be implemented in a form of hardware, or may be implemented in a form of a software functional unit.

Figure 14:
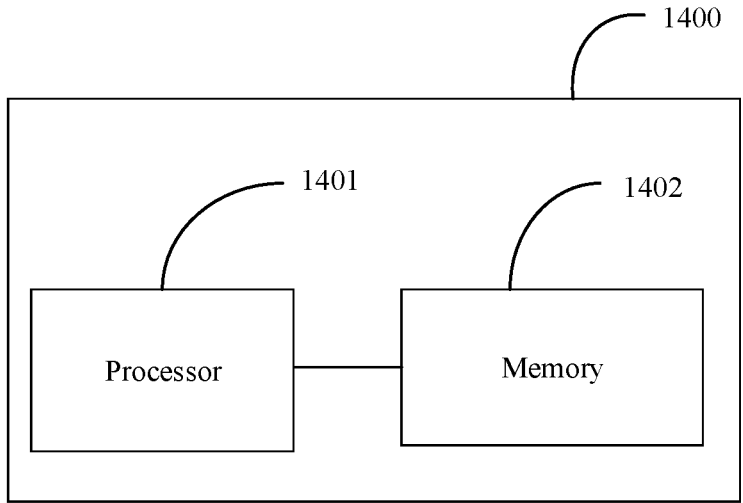
FIG. 14 is a possible schematic diagram of a structure of a service processing apparatus according to an embodiment of this application.

FIG. 14 is a possible schematic diagram of a structure of a service processing apparatus according to an embodiment of this application. As shown in FIG. 14, a service processing apparatus 1400 may include a processor 1401 and a memory 1402. The service processing apparatus may be applied to an OTN device at a transmit end (the embodiment corresponding to FIG. 3), and may also be applied to an OTN device at a receive end (the embodiment corresponding to FIG. 11). Program code used by the processor 1401 to implement the foregoing method may be stored in the memory 1402. The memory 1402 is coupled to the processor 1401. The processor 1401 may cooperate with the memory 1402.

In an example, all of the service data obtaining unit 1201, the mapping unit 1202, and the sending unit 1203 shown in FIG. 12 may be implemented by the processor 1401. For example, the processor 1401 may be the signal processor in the line board or the tributary board shown in FIG. 2. The processor 1401 is configured to implement the method performed by the OTN device at the transmit end in FIG. 3. In an implementation process, the steps in the processing procedure may be performed by using an integrated logic circuit of hardware in the processor 1401 or instructions in a form of software, to complete the method performed by the OTN device at the transmit end in FIG. 3.

In another example, both the receiving unit 1301 and the demapping unit 1302 shown in FIG. 13 may be implemented by the processor 1401. For example, the processor 1401 may be the signal processor in the line board or the tributary board shown in FIG. 2. The processor 1401 is configured to implement the method performed by the OTN device at the receive end in FIG. 11. In an implementation process, the steps in the processing procedure may be performed by using an integrated logic circuit of hardware in the processor 1401 or instructions in a form of software, to complete the method performed by the OTN device at the receive end in FIG. 11.

It should be further noted that when the processor 1401 performs a sending step, the processor 1401 may perform sending to an optical transceiver, so that the optical transceiver performs sending to a peer device. When performing a receiving step, the processor 1401 may receive OTN data from the optical transceiver, to perform another subsequent processing step.

In embodiments of this application, the processor 1401 may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor or any conventional processor or the like. The steps of the method disclosed with reference to embodiments of this application may be directly performed by a hardware processor, or may be performed by using a combination of hardware and software units in the processor. The coupling in embodiments of this application may be an indirect coupling or a communication connection between apparatuses, units, or modules in an electrical form, a mechanical form, or another form, and is used for information exchange between the apparatuses, the units, or the modules. The memory 1402 may be a non-volatile memory such as a hard disk drive (HDD), or may be a volatile memory such as a random-access memory (RAM). The memory 1402 is any other medium that can carry or store expected program code in a form of an instruction or a data structure and that can be accessed by a computer, but is not limited thereto.

Based on the foregoing embodiments, an embodiment of this application further provides a computer-readable storage medium. The storage medium stores a software program, and when the software program is read and executed by one or more processors, the method provided in one or more of the foregoing embodiments may be implemented. The computer-readable storage medium may include any medium that can store program code, for example, a USB flash drive, a removable hard disk, a read-only memory, a random-access memory, a magnetic disk, or an optical disc.

Based on the foregoing embodiments, an embodiment of this application further provides a chip. The chip includes a processor, configured to implement functions involved in any one or more of the foregoing embodiments, for example, obtain or process the data frame involved in the foregoing method. Optionally, the chip further includes a memory, and the memory is configured to store program instructions and data that are necessary for execution of the processor. The chip may include a chip, or may include a chip and another discrete component.

A person skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer-readable memory that can instruct the computer or the any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto the computer or the any other programmable data processing device, so that a series of operations and steps are performed on the computer or the any other programmable device, to generate computer-implemented processing. Therefore, the instructions executed on the computer or the any other programmable device provide steps for implementing a specific function in one or more processes in the flowcharts and/or in one or more blocks in the block diagrams.

Clearly, a person skilled in the art can make various modifications and variations to embodiments of this application without departing from the scope of embodiments of this application. In this way, this application is intended to cover these modifications and variations to embodiments of this application provided that they fall within the scope of protection defined by the following claims and their equivalent technologies.

What is claimed is:

1. A service processing method, wherein the method comprises:

obtaining service data;

encoding the service data to obtain encoded service data, wherein the encoded service data comprises control information and service data information;

mapping the control information to an overhead area of an optical transport network (OTN) transmission frame;

checking the control information to obtain check information;

mapping the check information to the overhead area of the OTN transmission frame;

mapping the service data information to a payload area of the OTN transmission frame; and sending the OTN transmission frame carrying the encoded service data, wherein the control information comprises a code block type indication, and when the code block type indication indicates that a 257b code block is a control code block, the encoded service data further comprises a first code block pattern indication, and the first code block pattern indication indicates a pattern of a 66b code block comprised in a code block in which the first code block pattern indication is located.

2. The method according to claim 1, wherein the service data is one of medium access control (MAC) frame data, an Internet protocol (IP) packet, a multi-protocol label switching (MPLS) packet, a flexible Ethernet (FlexE) service code block stream, or a 66b code block stream.

3. The method according to claim 1, wherein the encoding the service data comprises:

performing 64b/66b encoding on the service data to obtain the encoded service data.

4. The method according to claim 1, wherein the encoding the service data comprises:

performing 64b/66b encoding on the service data to obtain a 66b code block stream; and performing 256b/257b encoding processing on the 66b code block stream to obtain a 257b code block stream, wherein the 257b code block stream is the encoded service data.

5. The method according to claim 4, wherein the method further comprises:

encoding the first code block pattern indication comprised in the encoded service data into a second code block pattern indication, wherein a minimum Hamming distance between different values of the second code block pattern indication is 2.

6. The method according to claim 4, wherein when the code block type indication indicates that the 257b code block is a 257b control code block, and wherein the method further comprises:

adding a third code block pattern indication to the encoded service data, wherein the third code block pattern indication indicates a pattern of a 66b code block comprised in a code block in which the third code block pattern indication is located, and a minimum Hamming distance between different values of the third code block pattern indication is 2.

7. The method according to claim 4, wherein the OTN transmission frame is a flexible optical service unit (OSU-flex) frame.

8. The method according to claim 7, wherein a length of the OSUflex frame is one of 192 bytes, 240 bytes, 128 bytes, or 64 bytes.

9. The method according to claim 1, wherein the service data is a 66b code block stream, and wherein the encoding the service data comprises:

performing 256b/257b encoding processing on the service data to obtain the encoded service data.

10. The method according to claim 1, wherein the check information is cyclic redundancy check (CRC) information.

11. The method according to claim 1, wherein the check information is one or more backups of the control information.

12. The method according to claim 1, wherein a bit rate of the service data information is equal to a rate corresponding to the payload area of the OTN transmission frame.

13. The method according to claim 12, wherein the bit rate of the service data information is a rate obtained after an idle code block is added or deleted to perform rate adaptation, and wherein the bit rate of the service data information obtained after rate adaptation is equal to the rate corresponding to the payload area of the OTN transmission frame.

14. A service processing method, wherein the method comprises:

receiving an optical transport network (OTN) transmission frame, wherein the OTN transmission frame is used to carry encoded service data, and the encoded service data comprises control information and service data;

obtaining the control information and check information of the control information from an overhead area of the OTN transmission frame;

checking the control information based on the check information;

obtaining, based on a check result being correct, service data information from a payload area of the OTN transmission frame;

reassembling the control information and the service data information to obtain the encoded service data; and decoding the encoded service data to obtain the service data, wherein the control information comprises a code block type indication, and when the code block type indication indicates that a 257b code block is a control code block, the encoded service data further comprises a first code block pattern indication, and the first code block pattern indication indicates a pattern of a 66b code block comprised in a code block in which the first code block pattern indication is located.

15. The method according to claim 14, wherein the service data is one of medium access control (MAC) frame data, an Internet protocol (IP) packet, a multi-protocol label switching (MPLS) packet, a flexible Ethernet (FlexE) service code block stream, or a 66b code block stream.

16. The method according to claim 14, wherein the decoding the encoded service data comprises:

performing 64b/66b decoding on the encoded service data to obtain the service data.

17. An optical transport network (OTN) device, wherein the device comprises:

an optical transceiver configured to:

receive an OTN transmission frame sent by a processor; and send the OTN transmission frame, or receive the OTN transmission frame and send the OTN transmission frame to the processor; and the processor configured to:

obtain service data;

encode the service data to obtain encoded service data, wherein the encoded service data comprises control information and service data information;

map the control information to an overhead area of an OTN transmission frame;

check the control information to obtain check information;

map the check information to the overhead area of the OTN transmission frame;

map the service data information to a payload area of the OTN transmission frame; and send the OTN transmission frame carrying the encoded service data, wherein the control information comprises a code block type indication, and when the code block type indication indicates that a 257b code block is a control code block, the encoded service data further comprises a first code block pattern indication, and the first code block pattern indication indicates a pattern of a 66b code block comprised in a code block in which the first code block pattern indication is located.

\* \* \* \* \*